United States Patent
Vive et al.

(10) Patent No.: US 11,846,198 B2
(45) Date of Patent: Dec. 19, 2023

(54) TURBOMACHINE HAVING A FREE TURBINE COMPRISING ELECTRIC MACHINES ASSISTING A GAS GENERATOR AND A FREE TURBINE

(71) Applicant: SAFRAN HELICOPTER ENGINES, Bordes (FR)

(72) Inventors: Loïs Pierre Denis Vive, Moissy-Cramayel (FR); Olivier Bedrine, Moissy-Cramayel (FR); Thomas Drouin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/252,278

(22) PCT Filed: Nov. 12, 2021

(86) PCT No.: PCT/FR2021/052000
§ 371 (c)(1),
(2) Date: May 9, 2023

(87) PCT Pub. No.: WO2022/101586
PCT Pub. Date: May 19, 2022

(65) Prior Publication Data
US 2023/0323788 A1  Oct. 12, 2023

(30) Foreign Application Priority Data
Nov. 13, 2020 (FR) ........................... 2011634

(51) Int. Cl.
*F01D 15/10* (2006.01)
*F02C 7/32* (2006.01)
*F02C 7/275* (2006.01)

(52) U.S. Cl.
CPC .............. *F01D 15/10* (2013.01); *F02C 7/275* (2013.01); *F02C 7/32* (2013.01); *F05D 2220/76* (2013.01); *F05D 2260/85* (2013.01)

(58) Field of Classification Search
CPC .. F01D 15/10; F02C 7/275; F02C 7/32; F05D 2220/76; F05D 2260/85
See application file for complete search history.

(56) References Cited

U.S. PATENT DOCUMENTS

| | | | | |
|---|---|---|---|---|
| 10,336,442 | B2* | 7/2019 | Bedrine | F02C 7/06 |
| 2013/0098052 | A1* | 4/2013 | Bedrine | F02C 6/00 60/39.15 |

(Continued)

FOREIGN PATENT DOCUMENTS

| | | |
|---|---|---|
| FR | 2929324 A1 | 10/2009 |
| FR | 3019220 A1 | 10/2015 |

(Continued)

OTHER PUBLICATIONS

French Search Report issued in French Application No. 20 11634, dated Jul. 6, 2021.

(Continued)

*Primary Examiner* — Shafiq Mian
(74) *Attorney, Agent, or Firm* — Bookoff McAndrews, PLLC

(57) ABSTRACT

A turbomachine, particularly for a rotary-wing aircraft, including a gas generator provided with a rotary shaft, a first reversible electric machine, a power turbine rotationally driven by a stream of gas generated by the gas generator, at least one accessory from among an oil pump and a fuel pump, an accessory gearbox comprising a gear train configured to drive said at least one accessory, and a second electric machine.
The second electric machine is reversible, said first electric machine is mechanically coupled to the gas generator, the (Continued)

accessory gearbox and the second electric machine are mechanically coupled to the power turbine, and the turbomachine is devoid of any kinematic coupling between the gear train of the accessory gearbox and the shaft of the gas generator.

7 Claims, 3 Drawing Sheets

(56) References Cited

U.S. PATENT DOCUMENTS

| | | | | |
|---|---|---|---|---|
| 2015/0143950 A1* | 5/2015 | Bedrine | ............... | B64D 27/24 74/661 |
| 2016/0097328 A1* | 4/2016 | Wintgens | ............... | F02C 7/32 415/123 |
| 2017/0016399 A1* | 1/2017 | Bedrine | ............... | B64D 27/10 |
| 2017/0122221 A1* | 5/2017 | Marconi | ............... | F02C 3/10 |

FOREIGN PATENT DOCUMENTS

| | | |
|---|---|---|
| FR | 3081150 A1 | 11/2019 |
| FR | 3084340 A1 | 1/2020 |

OTHER PUBLICATIONS

International Search Report and Written Opinion issued in International Application No. PCT/FR2021/052000, dated Feb. 24, 2022.

\* cited by examiner

[FIG. 1]
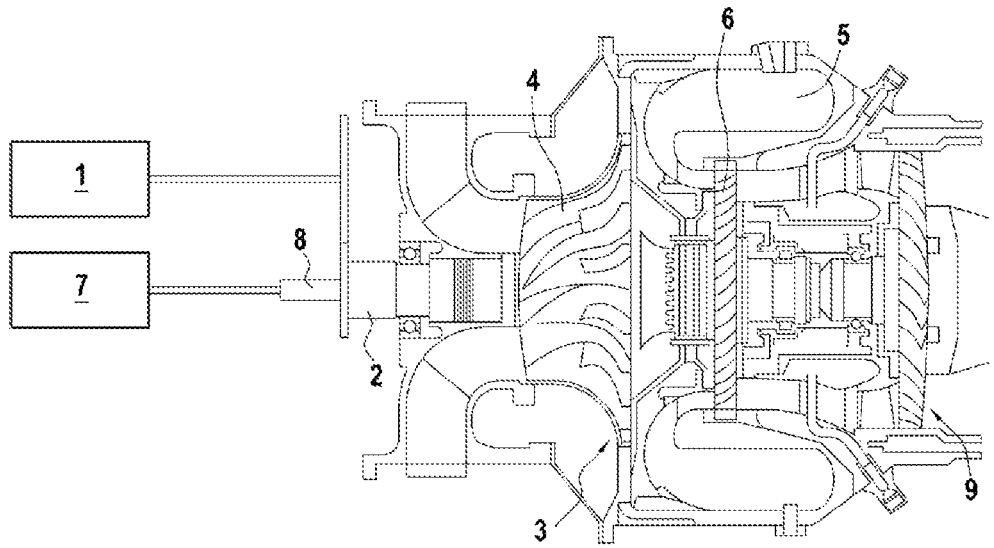
PRIOR ART
[FIG. 2]
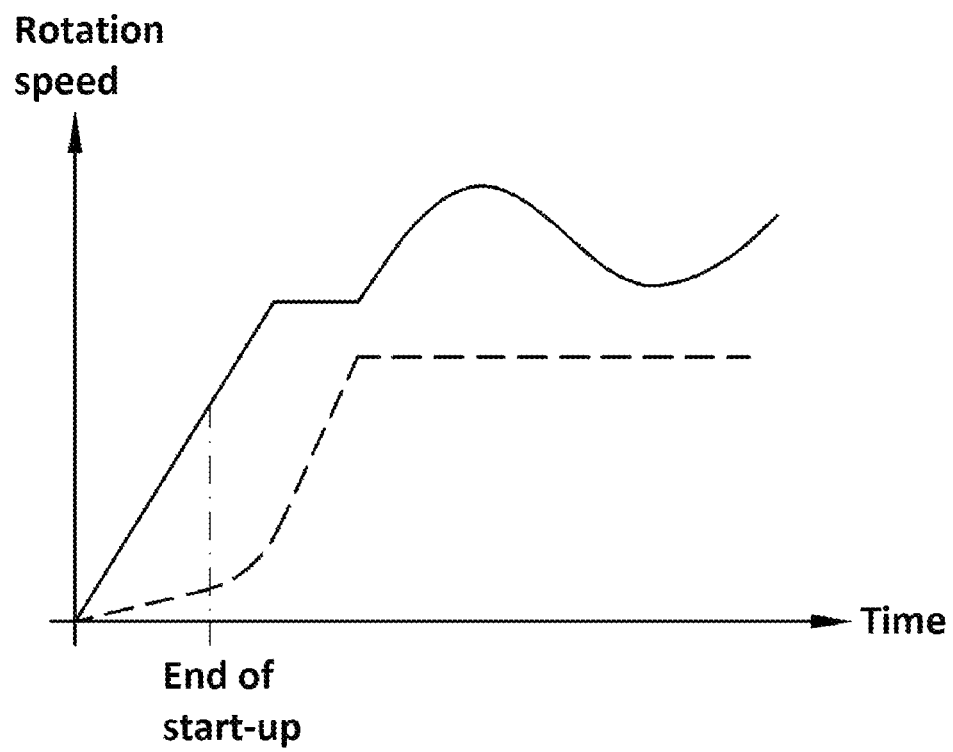
PRIOR ART

[FIG. 3]
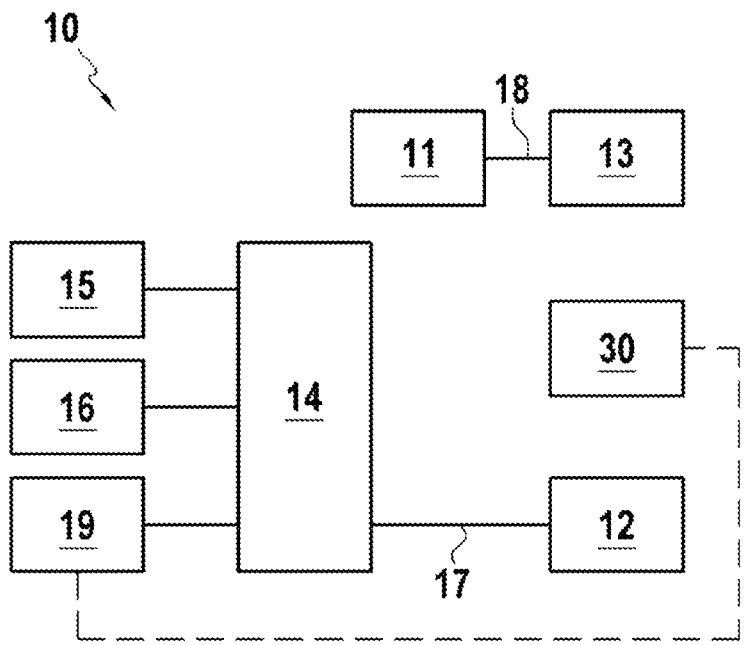
[FIG. 4]
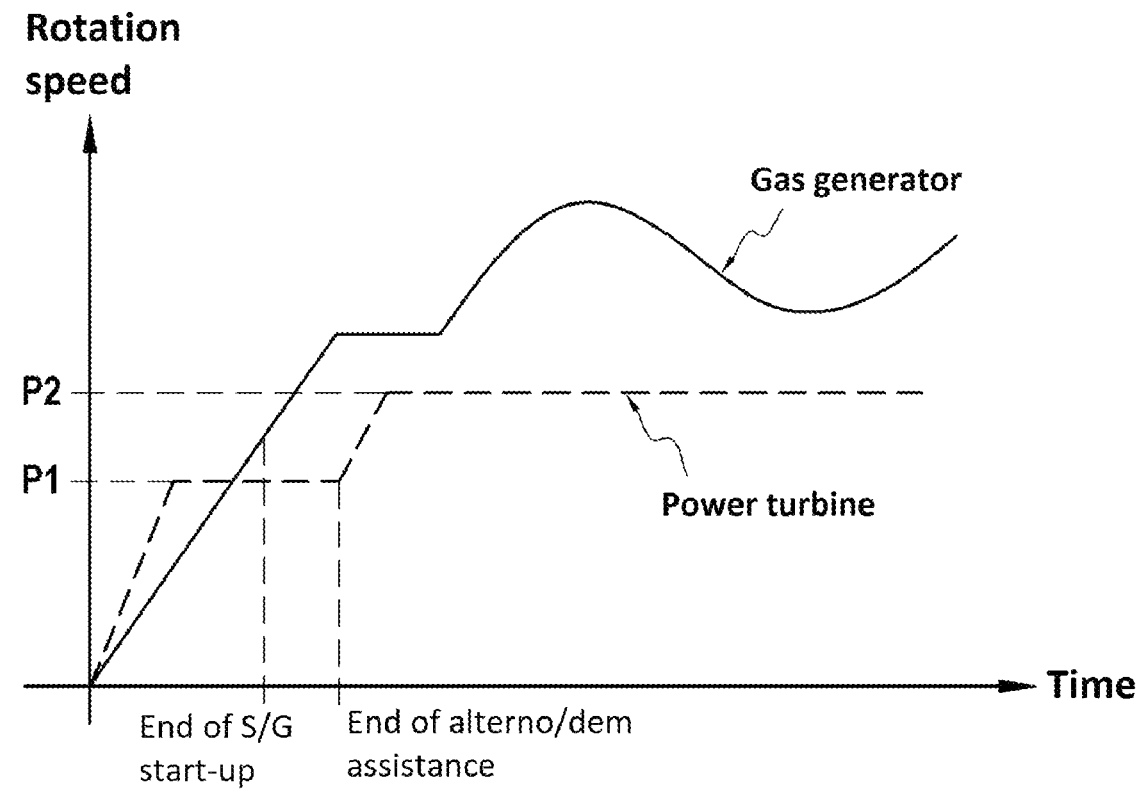

[FIG. 5]
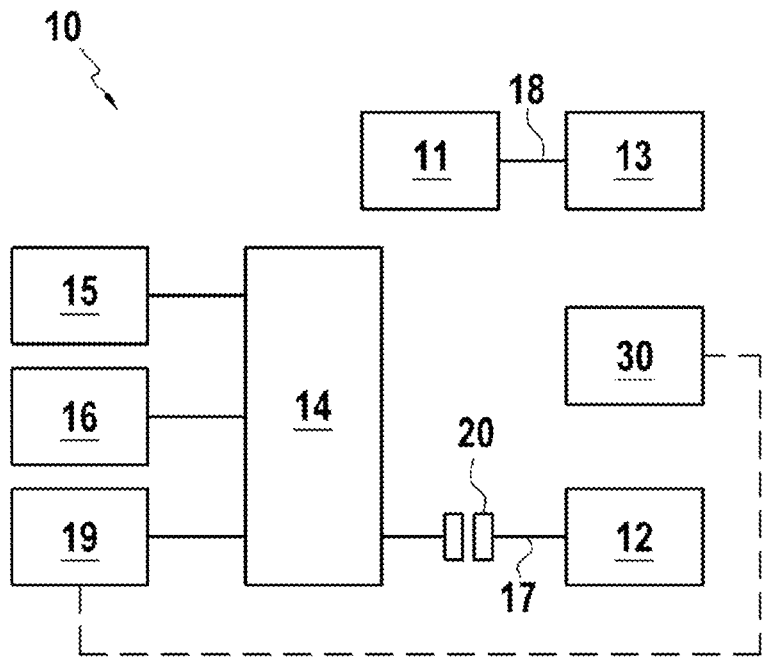
[FIG. 6]
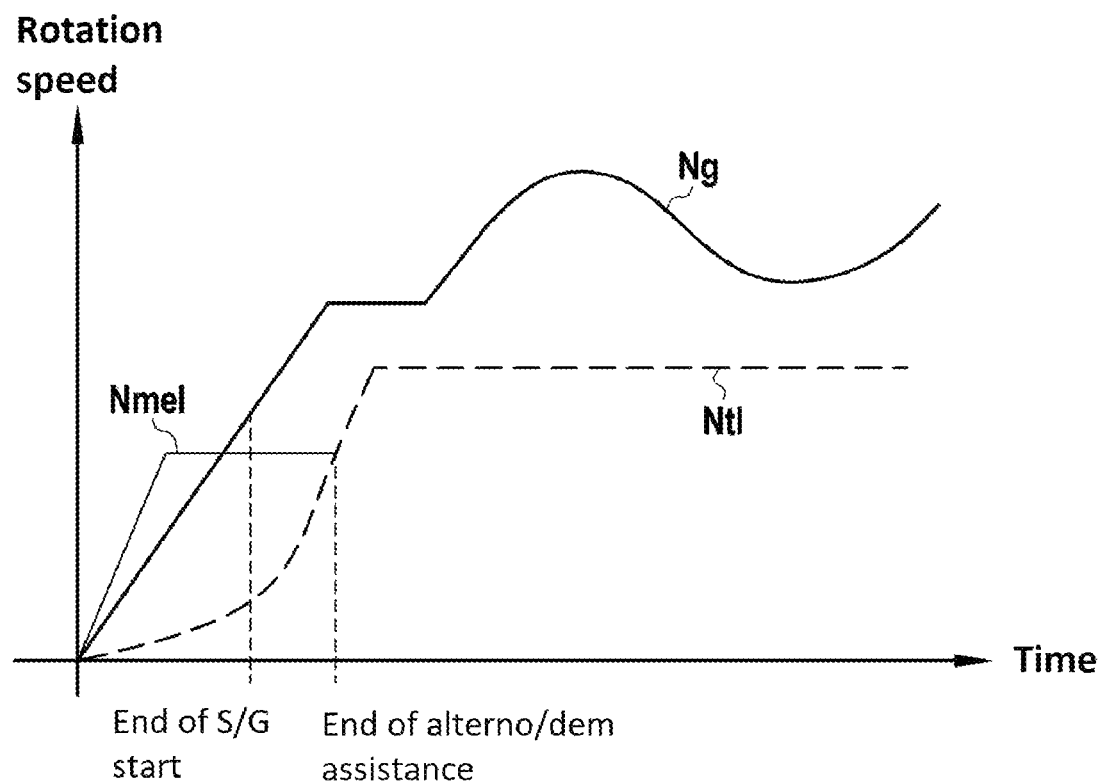

TURBOMACHINE HAVING A FREE TURBINE COMPRISING ELECTRIC MACHINES ASSISTING A GAS GENERATOR AND A FREE TURBINE

CROSS-REFERENCE TO RELATED APPLICATIONS

This is a National Stage Application under 35 U.S.C. § 371 of International Application No. PCT/FR2021/052000, filed Nov. 12, 2021, now published as WO 2022/101586 A1, which claims priority to French Patent Application No. 2011634, filed on Nov. 13, 2020.

TECHNICAL FIELD

This invention relates to the general field of aeronautical turbomachines and more specifically to the driving of the equipment via the power turbine without compromising their operation at the start-up of the turbomachine.

PRIOR ART

A turbomachine with a free turbine for helicopters generally includes a gas generator and a free turbine, or power turbine, rotationally driven by the stream of gas generated by the gas generator, and also a reversible electric machine which can be coupled to the gas generator, particularly to rotate the gas generator during a start-up phase of the turboshaft engine.

Conventionally, the gas generator includes at least a compressor and a turbine, rotationally coupled. The operating principle is as follows: the cool air entering the turboshaft engine is compressed due to the rotation of the compressor before being sent to a combustion chamber where it is mixed with fuel. The gas burned during combustion is then expelled at high speed.

A first expansion then takes place in the turbine of the gas generator, during which the latter extracts the energy needed to drive the compressor and equipment. The turbine of the gas generator does not absorb all the kinetic energy of the burned gas and the excess kinetic energy corresponds to the stream of gas generated by the gas generator. The latter therefore supplies the kinetic energy to the power turbine such that a second expansion takes place in the power turbine which converts this kinetic energy into mechanical energy in order to drive a receiving member, such as the helicopter rotor.

During the start-up phase of the turboshaft engine, it is necessary to rotationally drive the gas generator, i.e. rotationally drive the compressor coupled to the turbine as well as the different equipment connected thereto. As mentioned in the preamble, this is precisely one of the roles of the reversible electric machine, which is usually an electric motor able to function reversibly as an electric generator.

As illustrated in FIG. 1 which schematically represents a turbomachine with power turbine of the prior art, for start-up, an electric machine 1 operating as a motor drives the accessories, not represented, and the mechanical shaft 2 of the gas generator 3, until the rotation thereof is maintained by the combustion of fuel. Since the shaft 8 of the power turbine 9 is mechanically uncoupled from the shaft 2 of the gas generator, the electric machine 1 does not drive the shaft 8. The power turbine 9 is then driven solely by the stream of gas leaving the gas generator. This is because the rotational driving of the compressor by the electric machine 1 operating as a motor makes it possible to drive the equipment to supply the turbomachine with fuel and oil and to circulate the air in the compressor 4 and thus bring compressed air into the combustion chamber 5 to initiate combustion. This combustion then produces the gas flow used to rotationally drive the turbine 6 of the gas turbine 3, after which the compressor 4 and the equipment are directly rotationally driven by the turbine 6, which means that the gas generator 3 operates self-sustainingly, expressing the end of the start-up phase of the turboshaft engine.

Furthermore, for a turbojet engine with a power turbine such as that illustrated in FIG. 1, provision can be made for a second electrical machine 7 in engagement on the shaft 8 of the power turbine 9 to make it possible to meet the need for generation of large amounts of power.

It is known that aircraft, into which such turboshaft engines are particularly intended to be incorporated, contain many electric components that need to be supplied with electrical energy. For example, for an aircraft with vertical take-off and landing having electrical propulsion, it is necessary to supply all the electrical rotors with electrical energy.

On a turbomachine as illustrated in FIG. 1, the equipment such as the fuel pump and the oil pump are mechanically connected to the shaft 2 of the gas generator 3 via an accessory gearbox.

Once the start-up phase is finished, it is known to use the electric machine 1 if it is reversible in a generator operating mode to produce non-propulsive electrical energy (28V grid for example), to supply electricity to the electrical apparatuses. The electric machine 1 generates electrical energy by drawing mechanical power off the shaft 2 of the gas generator 3, the rotational kinetic energy drawn off the gas generator being converted into electrical energy by said machine.

This electric machine 1 can be non-reversible and composed of a single starter, if there is no need for electrical generation.

FIG. 2 illustrates the variation, as a function of time and the possible configuration of the turbomachine, of the rating of the shaft 2 of the gas generator 3 in solid lines and of the rating of the shaft 8 of the power turbine 9 in dotted lines. It can be seen that the variation in the rating of the two shafts is independent. The point corresponding to the time of exit from the start-up phase is also indicated.

For a turboshaft engine, with a power turbine and a conventional starting system using a reversible electric machine, the mechanical draw off the gas generator serving to generate electrical power by the reversible electric machine 1 operating in a generator mode impairs the performances of the gas generator.

Specifically, the variation, during the flight, of the mechanical power drawn by the electric machine 1 and the equipment on the gas generator manifests as a movement of the operating line of the engine in the compressor field. This movement corresponds to a surge margin for which provision must be made, which has the consequence of:

penalizing the optimization of the operating line of the engine, by prohibiting the use of the compressor at an optimal pressure ratio;

With such a configuration, a solution to avoid drawing mechanical power off the gas generator shaft to generate electricity consists in using an electric machine for the start-up function with a declutching system, and another electric machine secured to the power turbine shaft for the generation function as illustrated in FIG. 1 by the second electric machine 7, which is penalizing in terms of mass and cost for a conventional turboshaft engine or turbojet engine configuration. This architecture could nonetheless could become necessary if the need to decouple the "non-propulsive" electrical start-up/generating function from the main "propulsive" electrical generation function is compulsory from an electrical architecture point of view (redundancy, type of grid/storage available).

A known architecture used to start a turbojet engine with a power turbine without adding on any specific starter is disclosed in document FR 2 929 324. Should the need to decouple the functions not exist, this technical solution makes it possible to reduce the overall mass and cost and increase the reliability of the turbojet engine by comparison with a turbomachine comprising two electric machines as in FIG. 1. The technical solution described in this document consists in a switching system using two free wheels used to start the gas generator of a turboshaft engine with a power turbine, then to generate the non-propulsive electrical energy by drawing the mechanical energy off the power turbine shaft. The equipment remain driven via the gas generator and the accessory gearbox.

This solution particularly makes it possible to improve the transient performance of the gas generator, by avoiding the drawbacks of drawing kinematic energy off the gas generator, and particularly the problem of the movement of the engine operating line in the compressor field due to the variation, during the flight, of the mechanical power drawn by the electric machine.

To improve the performance of the turbomachine with power turbine and of the equipment during the start-up phase, it would also be beneficial to be able to drive all the equipment of the turbomachine via the power turbine. But because the performance of the fuel pump is associated with its rotation speed, the variation in speed of the power turbine after the start-up phase would not allow, or would severely impact the design of the fuel system assembly to guarantee the correct start-up of the turbomachine.

SUMMARY OF THE INVENTION

For this purpose, this invention makes provision for a turbomachine with power turbine equipped with a plurality of propulsive and non-propulsive electrical machines making it possible to improve the overall efficiency of the turbomachine while driving the equipment of the turbomachine independently of time and speed, with respect to the start-up of its gas generator.

In a subject of the invention, provision is made for a turbomachine, particularly for a rotary-wing aircraft, including a gas generator provided with a rotary mechanical shaft, a first reversible electric machine, a power turbine rotationally driven by a stream of gas generated by the gas generator, at least one accessory from among an oil pump and a fuel pump, an accessory gearbox comprising a gear train configured to drive said at least one accessory, and a second electric machine.

According to a technical feature of the invention, the second electric machine is reversible, the first electric machine is mechanically coupled to the gas generator, and the second electric machine and the accessory gearbox are mechanically coupled to the power turbine, and the turbomachine is devoid of any kinematic coupling between the gear train and the accessory gearbox (14) and the shaft (18) of the gas generator.

In this architecture, the gas generator and the accessory gearbox are thus devoid of any kinematic relation to one another. In addition, the accessories, in their entirety or only in part, are coupled to the power turbine to be driven solely by the power turbine once it has reached its self-sustaining operating rating. The self-sustaining operating rating of the power turbine corresponds to a rating at which the power turbine supplies a required power without any assistance, the only energy supplied to the power turbine being that of the stream of gas generated by the gas generator.

The accessories coupled to the power turbine only are no longer linked to the speed of rotation of the gas generator, which makes it possible to drive them at the correct speed, and especially in relation to their requirement and not to the requirement of the gas generator. For example, the pumps can be driven before the gas generator to prime the fuel circuit and therefore fill the channels and not have any failed start-up.

The coupling of all or part of the accessories to the power turbine rather than to the gas generator makes it possible to improve the overall efficiency of the turbomachine. Certain accessories, preferably those which only require a low mechanical draw energy, can however remain coupled to the gas generator, i.e. in direct or indirect engagement on the shaft of the latter. An example of an eligible accessory can be an alternator of PMA (Permanent Magnet Alternator) type which is used to supply the engine control unit and which can also include an integrated device for measuring the speed of the shaft of the gas generator.

The architecture of the turbomachine according to the invention with its two electrical machines thus makes it possible to initiate the simultaneous rotation of the accessories, of the power turbine and that of the gas generator until the gas generator can operate self-sustainingly, then to continue to drive the power turbine, and the accessories until the power turbine can also operate self-sustainingly. The accessories engaged on the TL can thus be driven by the second electric machine in phase advance with respect to the gas generator, which makes it possible to have a fuel and oil circuit in the best conditions to improve the start-up performance of the gas generator and to improve the intake and self-priming performance of the fuel circuit with respect to the limitations of integration into the aircraft.

On an application of the turbomachine of turbojet engine type, the electric machine engaged on the power turbine is dimensioned to generate large amounts of power, and can, when it is used in motor mode, easily deliver a torque to drive the power turbine and the accessories during the start-up phase.

Furthermore, the mechanical independence of the power turbine and of the gas generator offers the possibility of providing independent ventilation of the power turbine and of the gas generator to thermally control the turbomachine when it is stopped.

Furthermore, the architecture according to the invention makes it possible, in the event of rupture of the power turbine shaft in operation, to directly affect the driving of the accessories (including the fuel pump) which is done via this shaft. Since the fuel pump is no longer driven, this has the direct effect of instantaneously switching off the engine and therefore preventing the establishment of an overspeed of the power turbine. This architecture therefore has the effect of protecting the power turbine against an overspeed which would risk causing parts of the turbine to rupture under the effect of centrifugal forces. This architecture thus makes it possible to avoid having to rely on other overspeed protection devices such as blade shedding, with a potential mass gain (shielding).

According to a first aspect of the turbomachine, the second electric machine can be mechanically coupled to the power turbine via the accessory gearbox.

According to a second aspect of the turbomachine, the accessory gearbox can be mechanically coupled to the power turbine via a free wheel.

This solution only makes it possible to avoid the power turbine being driven by the second electric machine during the start-up phase which reduces the inertia and resistive torque.

This solution has the advantage of also being able to be used in a turboshaft engine configuration since the free wheel makes it possible to not drive the rotor.

The case of operating in locked power turbine mode could be embodied by transiently controlling the second electric machine in relation to the equipment.

According to a third aspect of the turbomachine, the turbomachine may further comprise a unit for controlling the second electric machine configured to make the electric machine operate in motor mode from the start-up of the turbomachine and until one of the operations of the power turbine has exceeded a threshold above which the power turbine is self-sustaining.

The turbomachine can also comprise a unit for controlling the first electric machine configured to actuate the first electric machine in motor mode starting from the start-up of the turbomachine or as per a performance criterion concerning the equipment (fuel pressure etc.) until one of the mechanical parameters of the first mechanical shaft has exceeded a threshold above which the gas generator is self-sustaining, then in generator mode once said parameter of the first mechanical shaft has exceeded said threshold above which the gas generator is self-sustaining.

According to a fourth aspect of the turbomachine, the second electric machine is a reversible electric machine, and said unit for controlling the second electric machine is configured to make the second electric machine operate in generator mode once said operating parameter of the power turbine has exceeded said threshold above which the power turbine is self-sustaining.

Once the power turbine is in self-sustaining rotation, the second electric machine can operate in generator mode and thus supply electrical power to other elements.

According to a fifth aspect of the turbomachine, the control unit can be configured to make the second electric machine operate in motor mode with a predetermined advance in relation to the start-up of the gas generator driven by the first electric machine, such that the driving of an oil pump and a fuel pump by the second electric machine is done at rotation ratings making it possible to have a fuel circuit and an oil circuit, each operating under optimal conditions for the start-up of the gas generator.

According to another aspect of the turbomachine, provision is made for an aircraft, such as a vertical take-off and landing aircraft, comprising at least a turbomachine as defined above.

BRIEF DESCRIPTION OF THE DRAWINGS

FIG. 1, already described, is a simplified schematic view of a turbomachine with power turbine of the prior art.

FIG. 2, already described, is a graphic representation of the variation, as a function of time and of the possible configuration of the turbojet engine, of the rating of the gas generator shaft and of the rating of the power turbine shaft of the turbomachine of FIG. 1.

FIG. 3 is a diagram of a turbomachine with power turbine according to a first embodiment of the invention.

FIG. 4 is a graphic representation of the variation, as a function of time and of the possible configuration of the turbojet engine, of the rating of the gas generator shaft and of the rating of the power turbine shaft of the turbomachine of FIG. 3.

FIG. 5 is a diagram of a turbomachine with power turbine according to a second embodiment of the invention.

FIG. 6 is a graphic representation of the variation, as a function of time and of the possible configuration of the turbojet engine, of the rating of the gas generator shaft and of the rating of the power turbine shaft of the turbomachine of FIG. 5.

DESCRIPTION OF THE EMBODIMENTS

FIG. 3 schematically represents a turbomachine 10 with a power turbine according to a first embodiment of the invention.

The turbomachine 10 comprises a first reversible electric machine 11, a power turbine 12, a gas generator 13, an accessory gearbox 14, a fuel pump 15, an oil pump 16, and a second reversible electric machine 19 also in this embodiment.

The power turbine 12 comprises a first shaft 17 and the gas generator 13 comprises a second shaft 18. The second shaft 18 of the gas generator 13 is connected to the first electric machine 11.

The first electric machine 11 is configured to operate in motor mode at the start-up of the turbomachine 10 and thus rotationally drive the second shaft 18 of the gas generator 13 from start-up until the gas generator is self-sustaining. In other words, until a first operating parameter of the gas generator 13 has exceeded an operating threshold of the gas generator 13 in self-sustaining state.

In this first embodiment, the first shaft 17 of the power turbine 12 is constantly mechanically connected without intermediary to the accessory gearbox 14. The accessory gearbox 14 is mechanically coupled to the second electric machine 19, which thus makes it possible to have the turbine 12 coupled to the second electric machine 19 during all the operating phases of the turbomachine 10, particularly during the start-up phase and the electrical generation phase.

In alternative, a rotor shaft of the second electric machine 19 could be in direct engagement on the first shaft 17 of the power turbine 12, for example with straight or bevel pinion gearing, so without involving a gear train of the accessory gearbox 14. In other words, the kinematic link between the second electric machine 19 and the power turbine 12 would not be made via the accessory gearbox 14. There again, the power turbine 12 would remain coupled to the second electric machine 19 during all the operating phases of the turbomachine.

The accessory gearbox 14 is also mechanically coupled to the fuel pump 15, on the one hand, and to the oil pump 16, on the other hand. In other embodiments other accessories can be mechanically coupled to the accessory gearbox 14.

The turbomachine 10 further comprises a control unit 30 of the second electric machine 19. The control unit 30 is configured to control the second electric machine 19 in a motor mode during a start-up phase of the turbomachine 10 and control it in a generator mode when the power available on the first shaft 17 of the power turbine 12 reaches a sufficient level to keep the equipment in rotation and ensure the correct operation of the GG. Since the power is the image of the self-sustaining state of the power turbine 12, it can be integrated in the form of an operating parameter.

The control unit 30 thus receives information relating to an operating parameter of the power turbine 12 and to the parameters of the second electric machine 19, such as the speed of rotation of the power turbine, of the electric machine or else the torque developed by the power turbine 12 or the electric machine, and regularly compares it to a threshold corresponding to the value of the parameter above which the power turbine can be considered as operating self-sustainingly. Since the second electric machine 19 is no longer useful to rotationally drive the power turbine 12 and the equipment, it can be put in generator mode once the power turbine is detected as self-sustaining, to supply the electrical power (for example for supplying engines of an aircraft with electrical propulsion, or else to store it in a storage unit).

The first electric machine 11 is meanwhile controlled in generator mode when the gas generator 13 reaches a speed threshold identified as the self-sustaining state threshold.

The first electric machine 11 can be controlled in generator mode (end of start-up) before the second electric machine 19 can itself be thus controlled (end of assistance).

FIG. 4 graphically represents the variation, as a function of time and of the possible turbomachine configuration, of the rating of the second shaft 18 of the gas generator 13 in solid lines and, in dotted lines, of the rating of the first shaft 17 of the power turbine 12 of the turbomachine 10 of FIG. 3.

By comparing the graph of FIG. 2 and that of FIG. 4, it can be seen that the architecture of the turbomachine 10 according to the invention allows a faster ramp-up of the power turbine 12 until the first speed plateau P1 is reached. This first plateau corresponds to the assistance by the second electric machine 19 with control of the speed of this machine, and is optimized for the correct operation of the equipment or accessories for the start-up phase, such as the fuel pump 15 and the oil pump 16 in particular. Then, after this first plateau, stopping the control of the speed of the second electric machine allows for a new increase in the rating of the power turbine 12, generated by the increase in the air stream delivered by the gas generator 13, until the power turbine 12 reaches a second speed plateau P2 corresponding to a nominal operating speed of the second electric machine 19 used in generator mode. Provision is made for the demultiplication ratios of the gear trains of the accessory gearboxes 14 to be such that the nominal operating speed of the power turbine 12 corresponds to the nominal operating speeds of the second electric machine 19 and of the other equipment or accessories driven by the accessory gearboxes.

In FIG. 5 is schematically presented a turbomachine 10 with a power turbine according to a second embodiment of the invention.

The turbomachine 10 of the second embodiment illustrated in FIG. 5 differs from the turbomachine 10 of the first embodiment illustrated in FIG. 3 solely in that it comprises a coupling device 20 configured to be able to commute between an engagement configuration and a disengagement configuration. The coupling device 20 can for example comprise a free wheel, coupled between the power turbine 12 and the gearing of the accessory gearbox 14 to which are connected the second electric machine 19 and other equipment or accessories. In this second embodiment, the power turbine 12 is therefore mechanically coupled to the second electric machine 19 via the coupling device 20 and the accessory gearbox 14.

Advantageously, the coupling device 20 can be passive, as is the case for a free wheel. However, a controlled coupling device remains possible, for example a clutch. In the case of a free wheel, this is configured to disengage when the speed of the limit of the free wheel connected to the accessory gearbox exceeds the speed of the limit of the free wheel connected to the shaft 17 of the power turbine 12. Thus, as long as the second electric machine 19 is controlled in a motor mode during a start-up phase of the turbomachine 10, the free wheel 20 is disengaged, such that the power turbine 12 is not driven by the second electric machine 19.

The ramp-up of the power turbine therefore varies independently and more slowly than that of the second electric machine 19, since the power turbine is driven only by the air stream delivered by the gas generator 13. Conversely, when the rating of the power turbine reaches a certain threshold for which the power turbine is able to drive the second electric machine 19 and the accessories via the accessory gearbox 14, the free wheel 20 is engaged, the speeds at its two limits then being the same.

During a start-up phase of the turbomachine, the second electric machine 19 is opposed by less inertia and resistive torque, by comparison with the solution without a free wheel described previously. If the turbomachine according to the invention is used in a turbojet engine configuration, for example to supply electrical energy used by an aircraft with electrical propulsion, this solution has the advantage during the start-up phase of having less of a need to draw on the electrical storage (batteries) of the aircraft to supply the second electric machine 19. A reduction in the capacity and therefore the mass of the aircraft batteries can then be envisioned.

The coupling device 20 of this solution is particularly advantageous in the context of the use of the turbomachine according to the invention in a turboshaft engine configuration, for example for a helicopter, the main rotor of which is driven by the shaft 17 of the power turbine via a transmission gearbox. Whether this coupling device 20 is in the form of a free wheel or of a controlled clutch, this makes it possible to avoid having to drive the main rotor of the helicopter during the start-up phase. The second electric machine 19 can therefore be dimensioned solely as a function of the electrical energy that it must produce in generator mode, and of the driving of the accessories that it must provide in motor mode via the accessory gearbox during the start-up phase.

FIG. 6 graphically represents the variation, as a function of time and the possible configuration of the turbomachine, of the rating Nmel of the second electric machine 19, in fine lines, of the rating Ng of the second shaft 18 of the gas generator 13 in bold lines and, in dotted lines, of the rating Ntl of the first shaft 17 of the power turbine 12 of the turbomachine 10 of FIG. 5.

By comparing the graph of FIG. 2 and that of FIG. 6, it can be seen that the ramp-up of the power turbine 12, Ntl, is identical to that of FIG. 2 for a same ramp-up, Ng, of the gas generator 13, but on the other hand, the ramp-up Nmel of the second electric machine 19 is similar to the ramp-up Ntl of the power turbine 12 of FIG. 4, which makes it possible to quickly make equipment or accessories operate, such as the fuel pump 15 and the oil pump 16 in particular. Once the rating of the power turbine 12 has reached that of the second electric machine 19, to the nearest reduction ratio if there is an indirect drive between the first shaft 17 and the rotor of the second electric machine 19 via gearings of the accessory gearbox 14, the motor mode of the second electric machine 19 is stopped, the power turbine 12 being then able to drive the accessories 15 and 16.

The turbomachine with power turbine according to this invention thus makes it possible to thus optimize the mass, cost and reliability of the switching system and therefore of the turbomachine. The use of a first electric machine for the gas generator on the one hand and of a second electric machine for the power turbine on the other hand, by mechanically decoupling the power turbine and the gas generator, makes it possible, owing to the configuration of the invention, to be able to drive the accessories via the power turbine in order to improve the overall efficiency of the turbomachine while keeping the possibility of driving the accessories independently of the gas generator during the start-up phase.

The invention claimed is:

1. A turbomachine, particularly for a rotary-wing aircraft, including a gas generator provided with a rotary mechanical shaft, a first reversible electric machine, a power turbine rotationally driven by a stream of gas generated by the gas generator, at least one accessory from among an oil pump and a fuel pump, an accessory gearbox comprising a gear train configured to drive said at least one accessory, and a second electric machine, wherein the second electric machine is reversible, the first electric machine is mechanically coupled to the gas generator, the accessory gearbox and the second electric machine are mechanically coupled to the power turbine, and the turbomachine is devoid of any kinematic coupling between the gear train of the accessory gearbox and the shaft of the gas generator, the turbomachine further comprising a unit for controlling the second electric machine, and, during the start-up of the turbomachine, the control unit being configured to make the electric machine operate in motor mode with a predetermined advance with respect to the start-up of the gas generator driven by the first electrical machine, such that the driving of an oil pump and a fuel pump by the second electric machine is done at rotation ratings making it possible to have a fuel circuit and an oil circuit each operating under optimal conditions for the start-up of the gas generator.

2. The turbomachine as claimed in claim 1, wherein the second electric machine is mechanically coupled to the power turbine via the accessory gearbox.

3. The turbomachine as claimed in claim 1, wherein the accessory gearbox is mechanically coupled to the power turbine via a coupling device.

4. The turbomachine as claimed in claim 3, wherein the coupling device comprises a free wheel.

5. The turbomachine as claimed in claim 1, wherein the control unit is configured to make the second electrical machine operate in motor mode from the start-up of the turbomachine and until one of the operating parameters of the power turbine has exceeded a threshold above which the power turbine is self-sustaining.

6. The turbomachine as claimed in claim 5, wherein the second electric machine is a reversible electric machine, and said unit for controlling the second electric machine is configured to make the second electric machine operate in generator mode once said operating parameter of the power turbine has exceeded said threshold above which the power turbine is self-sustaining.

7. An aircraft comprising at least one turbomachine as claimed in claim 1.

* * * * *